(12) United States Patent
Alexander et al.

(10) Patent No.: US 8,590,303 B2
(45) Date of Patent: Nov. 26, 2013

(54) VEHICLE ENERGY HARVESTING DEVICE HAVING A CONTINUOUS LOOP OF SHAPE MEMORY ALLOY

(75) Inventors: Paul W. Alexander, Ypsilanti, MI (US); Alan L. Browne, Grosse Pointe, MI (US); Nancy L. Johnson, Northville, MI (US); Patrick B. Usoro, Troy, MI (US); Geoffrey P. McKnight, Los Angeles, CA (US); Peter Maxwell Sarosi, Royal Oak, MI (US); Christopher P. Henry, Thousand Oaks, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 512 days.

(21) Appl. No.: 12/947,872

(22) Filed: Nov. 17, 2010

(65) Prior Publication Data

US 2011/0120114 A1 May 26, 2011

Related U.S. Application Data

(60) Provisional application No. 61/263,162, filed on Nov. 20, 2009.

(51) Int. Cl.
*F01B 29/10* (2006.01)
*F02G 1/04* (2006.01)
*F02G 3/00* (2006.01)
*F01N 3/02* (2006.01)
*F01N 5/02* (2006.01)

(52) U.S. Cl.
USPC ................................. 60/527; 60/616; 60/320

(58) Field of Classification Search
USPC .............................. 60/527–529; 310/306, 307
See application file for complete search history.

(56) References Cited

U.S. PATENT DOCUMENTS

| 4,117,680 | A | * | 10/1978 | Smith | 60/527 |
|---|---|---|---|---|---|
| 4,150,544 | A | | 4/1979 | Pachter | |
| 4,275,561 | A | * | 6/1981 | Wang | 60/527 |
| 4,281,513 | A | * | 8/1981 | Johnson et al. | 60/527 |
| 4,302,938 | A | * | 12/1981 | Li | 60/527 |
| 4,472,939 | A | * | 9/1984 | Wang | 60/527 |
| 4,761,955 | A | * | 8/1988 | Bloch | 60/528 |
| 4,938,026 | A | * | 7/1990 | Goldstein | 60/527 |
| 4,996,842 | A | * | 3/1991 | Goldstein | 60/527 |
| 5,086,618 | A | * | 2/1992 | Tanaka | 60/527 |
| 5,556,370 | A | * | 9/1996 | Maynard | 600/151 |
| 5,996,346 | A | * | 12/1999 | Maynard | 60/527 |

FOREIGN PATENT DOCUMENTS

JP 2003232276 A 8/2003

* cited by examiner

*Primary Examiner* — Kenneth Bomberg
*Assistant Examiner* — Christopher Jetton
(74) *Attorney, Agent, or Firm* — Quinn Law Group, PLLC

(57) ABSTRACT

An energy harvesting system comprises a first region having a first temperature and a second region having a second temperature. A conduit is located at least partially within the first region. A heat engine configured for converting thermal energy to mechanical energy includes a shape memory alloy forming at least one generally continuous loop. The shape memory alloy is disposed in heat exchange contact with the first region and the second region. A carrier surrounds the conduit such that the carrier is driven to rotate around the conduit by the shape memory alloy in response to the temperature difference between the first region and the second region.

19 Claims, 3 Drawing Sheets

VEHICLE ENERGY HARVESTING DEVICE HAVING A CONTINUOUS LOOP OF SHAPE MEMORY ALLOY

CROSS REFERENCE TO RELATED APPLICATIONS

This application claims the benefit of U.S. Provisional Application Ser. No. 61/263,162 filed Nov. 20, 2009, the entire contents of which are hereby incorporated by reference.

TECHNICAL FIELD

The present invention generally relates to a vehicle, and more specifically, to an energy source for the vehicle and vehicle accessories.

BACKGROUND

Vehicles are traditionally powered by engines that drive the vehicle and batteries that provide power for starting the engine and for vehicle accessories. Advancements in technology and a desire for driver conveniences have increased the number of vehicle accessories, as well as increased the load, i.e., power demand, on the engine and/or the battery required to power the vehicle accessories. In addition, the vehicle power sources and components produce a large quantity of waste heat, i.e., waste thermal energy that is typically dissipated into the atmosphere and lost.

Accordingly, arrangements for extending driving range and increasing the fuel efficiency of the vehicle are desirable. Therefore, systems that increase the fuel efficiency of the vehicle and reduce the power load on the vehicle's traditional power sources, i.e., the engine and/or the battery, are desirable, and significant vehicle fuel economy gains may be realized if the vehicle's waste heat is converted into usable mechanical and/or electrical energy.

SUMMARY

An energy harvesting system comprises a first region having a first temperature and a second region having a second temperature that is different from the first temperature. A conduit is located at least partially within the first region. A heat engine configured for converting thermal energy to mechanical energy includes a shape memory alloy forming at least one generally continuous loop. The shape memory alloy is disposed in heat exchange contact with the first region and the second region. A carrier surrounds the conduit such that the carrier is driven to rotate around the conduit by the shape memory alloy in response to the temperature difference between the first region and the second region. A component is driven by the rotation of the carrier.

A method of harvesting energy comprises moving localized regions of a shape memory alloy between heat exchange contact with a first region having a first temperature and a second region having a second temperature that is different from the first temperature, such that at least one continuous loop of the shape memory alloy rotates around a conduit located within the first region in response to the temperature difference between the first region and the second region. A carrier is rotated with the shape memory alloy and a component is driven by the rotation of the carrier.

A vehicle includes a conduit, a first region that has a first temperature, and a second region that has a second temperature that is different from the first temperature. The first region surrounds the conduit, and the second region at least partially surrounds the first region. A heat engine for the vehicle, configured for converting thermal energy to mechanical energy, includes a carrier concentrically located about the conduit. A plurality of inner pulleys and a plurality of outer pulleys are rotatably mounted to the carrier in an alternating relationship with one another. At least one continuous loop of a shape memory alloy is alternately threaded about an interior of the plurality of inner pulleys and an exterior of the outer pulleys surrounding the conduit. The shape memory alloy is disposed in heat exchange contact with the first region and the second region such that the carrier is driven to rotate around the conduit by the shape memory alloy in response to the temperature difference between the first region and the second region. A component of the vehicle is driven by the rotation of the at least one carrier.

The above features and advantages, and other features and advantages of the present invention will be readily apparent from the following detailed description of the preferred embodiments and best modes for carrying out the present invention when taken in connection with the accompanying drawings and appended claims.

DETAILED DESCRIPTION

Figure 1:
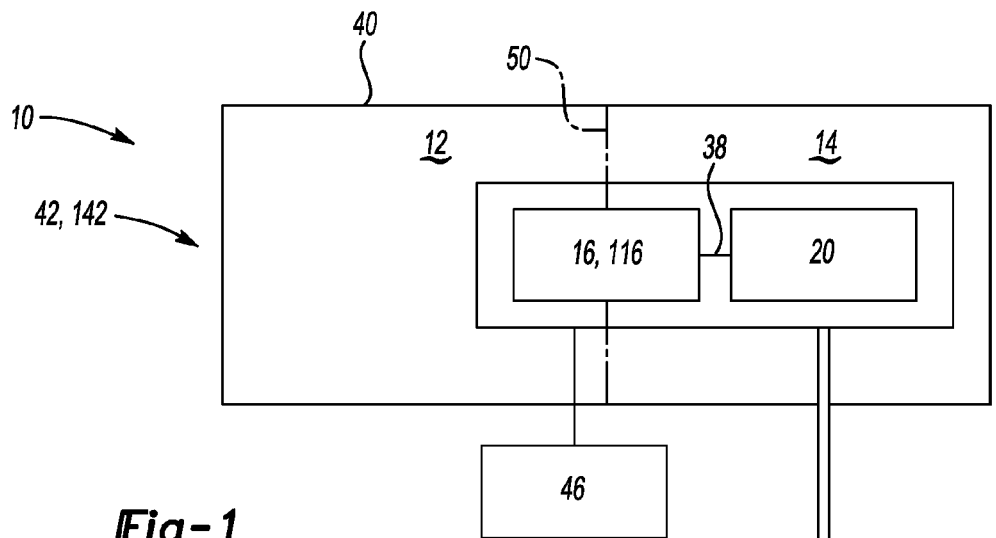
FIG. 1 is a schematic diagram of a vehicle having an energy harvesting system.

Referring to the Figures, wherein like reference numerals refer to like elements, a vehicle is shown generally at 10 in FIG. 1. The vehicle 10 includes an energy harvesting system 42, 142. The energy harvesting system 42, 142 utilizes the temperature difference between a first region 12 and a second region 14 to generate mechanical or electrical energy, and therefore may be useful for automotive applications. However, it is to be appreciated that the energy harvesting system 42, 142 may also be useful for non-automotive applications. The energy harvesting system 42, 142 includes a heat engine 16, 116. The heat engine 16, 116 is configured for converting thermal energy, e.g., heat, to mechanical or heat to mechanical and then to electrical energy, as set forth in more detail below.

The vehicle 10 defines a compartment 40 which may house power and drive sources for the vehicle 10, such as an engine and transmission (not shown). The compartment 40 may or may not be enclosed from the surrounding environment, and may include regions and components exterior to the vehicle 10 such as an exhaust pipe and catalytic converter, a radiator hose, shock absorbers, brakes, and any other region where energy is dissipated as heat proximate to or in the vehicle 10 such as in a passenger compartment, engine compartment, or a battery compartment (such as in an electric vehicle).

The energy harvesting system 42, 142 is at least partially located within the compartment 40. The power and drive sources (not shown) for the vehicle 10 typically generate heat. Therefore, the compartment 40 includes the first region 12 and the second region 14 having a temperature difference therebetween. The first region 12 and the second region 14 may be spaced apart from one another to provide a sufficient heat exchange barrier 50 between the first region 12 and the second region 14.

Fluid within the energy harvesting system 42, 142 may fill the first region 12 and the second region 14 and may be selected from a group of gases, liquids, and combinations thereof. The fluid within the first region 12 may be a different fluid than the fluid within the second region 14. In the embodiment discussed above where the compartment 40 is an engine compartment, fluid within the first region 12 and the second region 14 is air within the compartment 40. Objects located within the first region 12 and the second region 14 may generate or dissipate heat to the fluid surrounding the object and forming the first region 12 and the second region 14. Alternatively, the first region 12 and/or the second region 14 may be the object that is the heat source or heat sink and the energy harvesting system 42, 142 may have physical contact with the first region 12 and the second region 14 to take advantage of the temperature difference therebetween.

Several examples within a vehicle 10 where the energy harvesting system 42, 142 may take advantage of temperature differentials are proximate to or incorporated with an exhaust system, including proximity to a catalytic converter, next to a battery for the vehicle or within a battery compartment for electric vehicles, proximate to a transmission, brakes, or components of the vehicle suspension in particular a shock absorber, or proximate to or incorporated within a heat exchanger, such as a radiator. The above examples list areas of the vehicle 10 which may act as one of the first region 12 or the second region 14. The energy harvesting system 42, 142 may be positioned such that the other of the first region 12 or the second region 14 is separated by a sufficient heat exchange barrier 50 to provide the required temperature differential. The above list only provides examples of where the energy harvesting system 42, 142 may be located and is not intended to be all inclusive of arrangements for the energy harvesting system 42, 142. One skilled in the art would be able to determine areas having an associated temperature differential and an appropriate position for the energy harvesting system 42, 142 to take advantage of the temperature differences.

The energy harvesting system 42, 142 also includes a driven component 20. The component 20 may be a simple mechanical device, selected from a group including a fan, a belt, a clutch drive, a blower, a pump, a compressor and combinations thereof. The component 20 is driven by the heat engine 16, 116. The component 20 may be part of an existing system within the vehicle 10 such as a heating or cooling system. The mechanical energy may drive the component 20 or may assist other systems of the vehicle 10 in driving the component 20. Driving the component 20 with power provided by the heat engine 16, 116 may also allow an associated existing system within the vehicle 10 to be decreased in size/capacity providing weight savings in addition to the energy savings.

Alternately, the component 20 may be a generator or part of a generator. The component/generator 20 is configured for converting mechanical energy from the heat engine 16, 116 to electricity (represented generally by symbol EE in FIG. 1). The component/generator 20 may be any suitable device for converting mechanical energy to electricity EE. For example, the component/generator 20 may be an electrical generator that converts mechanical energy to electricity EE using electromagnetic induction, and may include a rotor (not shown) that rotates with respect to a stator (not shown). The electrical energy EE from the component/generator 20 may than be used to assist in powering the main or accessory drive systems within the vehicle 10.

As explained above, the energy harvesting system 42, 142 is configured for generating mechanical or electric energy and includes structure defining the first region 12 having a first temperature and structure defining the second region 14 having a second temperature that is different from the first temperature. For example, the temperature difference between the first region 12 and the second region 14 may be as little as about 5° C. and no more than about 100° C. Stated differently, the temperature difference may be greater than or equal to about 5° C. and less than or equal to about 30° C., e.g., less than or equal to about 10° C.

In one variation, the energy harvesting system 42, 142 also includes an electronic control unit 46. The electronic control unit 46 is in operable communication with the vehicle 10. The electronic control unit 46 may be, for example, a computer that electronically communicates with one or more controls and/or sensors of the energy harvesting system 42, 142. For example, the electronic control unit 46 may communicate with and/or control one or more of a temperature sensor within the first region 12, a temperature sensor within the second region 14, a speed regulator of the component 20, fluid flow sensors, and meters configured for monitoring electricity generation. The electronic control unit 46 may control the harvesting of energy under predetermined conditions of the vehicle 10. For example, after the vehicle 10 has operated for a sufficient period of time to ensure that a temperature differential between the first region 12 and the second region 14 is at an optimal difference. An electronic control unit 46 may also provide the option to manually override the heat engine 16, 116 to allow the energy harvesting system 42, 142 to be turned off. A clutch (not shown) controlled by the electronic control unit 46 may be used to disengage the heat engine 16, 116 from the component 20.

As also shown in FIG. 1, the energy harvesting system 42, 142 includes a transfer medium 48 configured for conveying electricity EE from the energy harvesting system 42, 142. In particular, the transfer medium 48 may convey electricity EE from the component/generator 20. The transfer medium 48 may be, for example, a power line or an electrically-conductive cable. The transfer medium 48 may convey electricity EE from the component/generator 20 to a storage device 54, e.g., a battery for the vehicle. The storage device 54 may also be located proximate to but separate from the vehicle 10. Such a storage device 54 may allow the energy harvesting system 42, 142 to be utilized with a parked vehicle such as 10. For example, the energy harvesting system 42, 142 may take advantage of a temperature differential created by sun load on a hood for the compartment 40 and store the electrical energy EE generated in the storage device 54.

Whether the energy from the energy harvesting system 42, 142 is used to drive a component 20 directly or stored for later usage the energy harvesting system 42, 142 provides additional energy to the vehicle 10 and reduces the load on the main energy sources for driving the vehicle 10. Thus, the energy harvesting system 42, 142 increases the fuel economy and range for the vehicle 10. As described above, the energy harvesting system 42, 142 may operate autonomously requiring no input from the vehicle 10.

It is to be appreciated that for any of the aforementioned examples, the vehicle 10 and/or the energy harvesting system 42, 142 may include a plurality of heat engines 16, 116 and/or a plurality of components 20. That is, one vehicle 10 may include more than one heat engine 16, 116 and/or component 20. For example, one heat engine 16, 116 may drive more than one component 20. Likewise, vehicle 10 may include more than one energy harvesting system 42, 142, each including at least one heat engine 16, 116 and component 20. Multiple heat engines 16, 116 may take advantage of multiple regions of temperature differentials throughout the vehicle 10.

Figure 2:
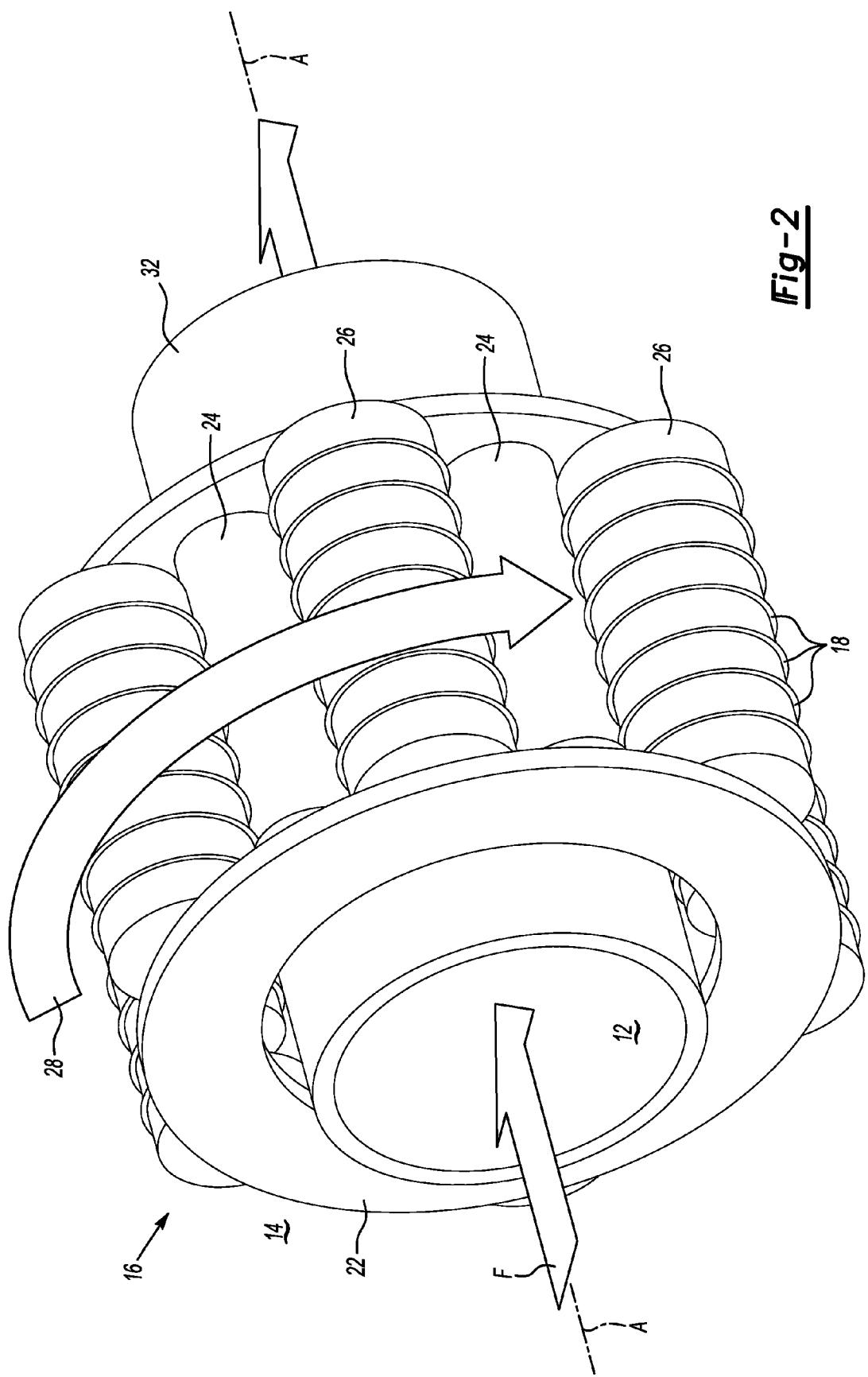
FIG. 2 is a schematic perspective view of a first embodiment of the energy harvesting system of FIG. 1.

Referring now to FIGS. 1 and 2, the heat engine 16 is configured for converting thermal energy, e.g., heat, to mechanical energy or heat to mechanical energy and then to electrical energy, as set forth in more detail below. The heat engine 16 includes a shape memory alloy 18 (FIG. 2) having a crystallographic phase changeable between austenite and martensite at a specific temperature to which the shape memory alloy 18 is exposed in one of the first region 12 and the second region 14. In response to the temperature difference of the first region 12 and the second region 14 (FIG. 1) the shape memory alloy undergoes the crystallographic phase change while passing between the first region 12 and the second region 14. The below description is in reference to FIG. 2. However, the shape memory alloy 18 of all the embodiments operates in a similar manner.

As used herein, the terminology "shape memory alloy" refers to alloys which exhibit a shape-memory effect. That is, the shape memory alloy 18 may undergo a solid state phase change via molecular rearrangement to shift between a martensite phase, i.e., "martensite", and an austenite phase, i.e., "austenite". Stated differently, the shape memory alloy 18 may undergo a displacive transformation rather than a diffusional transformation to shift between martensite and austenite. In general, the martensite phase refers to the comparatively lower-temperature phase and is often more deformable than the comparatively higher-temperature austenite phase. The temperature at which the shape memory alloy 18 begins to change from the austenite phase to the martensite phase is known as the martensite start temperature, $M_s$. The temperature at which the shape memory alloy 18 completes the change from the austenite phase to the martensite phase is known as the martensite finish temperature, $M_f$. Similarly, as the shape memory alloy 18 is heated, the temperature at which the shape memory alloy 18 begins to change from the martensite phase to the austenite phase is known as the austenite start temperature, $A_s$. And, the temperature at which the shape memory alloy 18 completes the change from the martensite phase to the austenite phase is known as the austenite finish temperature, $A_f$.

Therefore, the shape memory alloy 18 may be characterized by a cold state, i.e., when a temperature of the shape memory alloy 18 is below the martensite finish temperature $M_f$ of the shape memory alloy 18. Likewise, the shape memory alloy 18 may also be characterized by a hot state, i.e., when the temperature of the shape memory alloy 18 is above the austenite finish temperature $A_f$ of the shape memory alloy 18.

In operation, i.e., when exposed to the temperature difference of first region 12 and the second region 14, the shape memory alloy 18, if pre-strained or subjected to tensile stress, can change dimension upon changing crystallographic phase to thereby convert thermal energy to mechanical energy. That is, the shape memory alloy 18 may change crystallographic phase from martensite to austenite and thereby dimensionally contract if pseudoplastically pre-strained so as to convert thermal energy to mechanical energy. Conversely, the shape memory alloy 18 may change crystallographic phase from austenite to martensite and if under stress thereby dimensionally expand so as to convert thermal energy to mechanical energy.

Pseudoplastically pre-strained refers to stretching the shape memory alloy 18 while in the martensite phase so that the strain exhibited by the shape memory alloy 18 under that loading condition is not fully recovered when unloaded, where purely elastic strain would be fully recovered. In the case of shape memory alloy 18, it is possible to load the material such that the elastic strain limit is surpassed and deformation takes place in the martensitic crystal structure of the material prior to exceeding the true plastic strain limit of the material. Strain of this type, between those two limits, is pseudoplastic strain, called such because upon unloading it appears to have plastically deformed, but when heated to the point that the shape memory alloy 18 transforms to its austenite phase, that strain can be recovered, returning the shape memory alloy 18 to the original length observed prior to any load applied. Shape memory alloy 18 is typically stretched before installation into the heat engine 18, such that the nominal length of the shape memory alloy 18 includes that recoverable pseudoplastic strain, which provides the motion used for actuating/driving the heat engine 16. Without pre-stretching the shape memory alloy 18, little deformation would be seen during phase transformation.

The shape memory alloy 18 may have any suitable composition. In particular, the shape memory alloy 18 may include an element selected from the group including cobalt, nickel, titanium, indium, manganese, iron, palladium, zinc, copper, silver, gold, cadmium, tin, silicon, platinum, gallium, and combinations thereof. For example, suitable shape memory alloys 18 may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations thereof. The shape memory alloy 18 can be binary, ternary, or any higher order so long as the shape memory alloy 18 exhibits a shape memory effect, e.g., a change in shape orientation, damping capacity, and the like. A skilled artisan may select the shape memory alloy 18 according to desired operating temperatures within the compartment 40 (FIG. 1), as set forth in more detail below. In one specific example, the shape memory alloy 18 may include nickel and titanium.

Further, the shape memory alloy 18 may have any suitable form, i.e., shape. For example, the shape memory alloy 18 may have a form selected from the group including bias members (such as springs), tapes, wires, bands, continuous loops, and combinations thereof. Referring to FIG. 2, in one variation, the shape memory alloy 18 may be formed as a continuous loop spring.

The heat engine 16, and more specifically, the shape memory alloy 18 (FIG. 2) of the heat engine 16, is disposed in thermal contact or heat exchange relation with each of the first region 12 and the second region 14. Therefore, the shape memory alloy 18 may change crystallographic phase between austenite and martensite upon thermal contact or heat exchange relation with one of the first region 12 and the second region 14. For example, upon contact with the first region 12, the shape memory alloy 18 may change from martensite to austenite. Likewise, upon contact with the second region 14, the shape memory alloy 18 may change from austenite to martensite.

Further, the shape memory alloy 18 may change both modulus and dimension upon changing crystallographic phase to thereby convert thermal energy to mechanical energy. More specifically, the shape memory alloy 18, if pseudoplastically pre-strained may dimensionally contract upon changing crystallographic phase from martensite to austenite and may dimensionally expand, if under tensile stress, upon changing crystallographic phase from austenite to martensite to thereby convert thermal energy to mechanical energy. Therefore, for any condition wherein the temperature difference exists between the first temperature of the first region 12 and the second temperature of the second region 14, i.e., wherein the first region 12 and the second region 14 are not in thermal equilibrium, the shape memory alloy 18 may dimensionally expand and contract upon changing crystallographic phase between martensite and austenite. And, the change in crystallographic phase of the shape memory alloy 18 may cause the shape memory alloy to rotate the pulleys 24, 26 (shown in FIG. 2) and, thus, drive the component 20.

Figure 3:
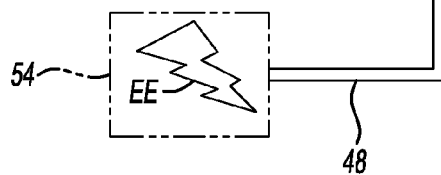
FIG. 3 is a partial schematic end view of the first embodiment of the energy harvesting system of FIGS. 1 and 2.
Figure 3:
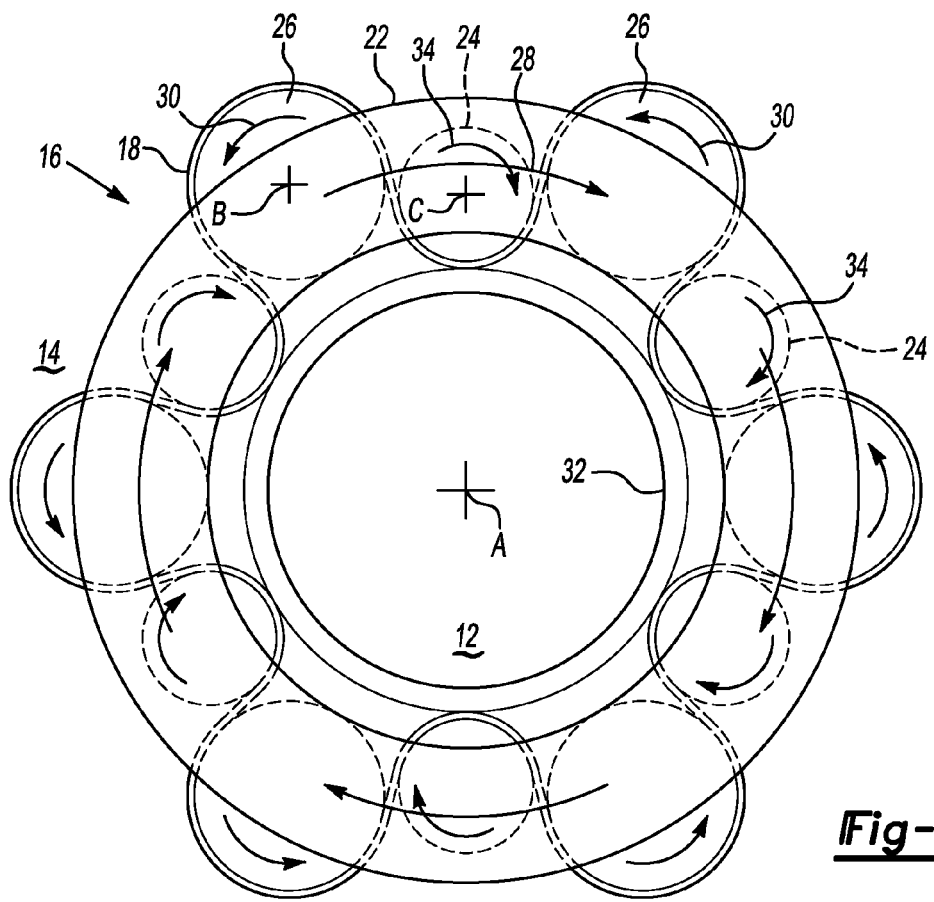

Referring to FIGS. 2 and 3, the component 20 (shown in FIG. 1) is driven by the heat engine 16. That is, mechanical energy resulting from the conversion of thermal energy by the shape memory alloy 18 may drive the component 20. In particular, the aforementioned dimensional contraction and the dimensional expansion of the shape memory alloy 18 coupled with the changes in modulus may drive the component 20.

The heat engine 16 may include a carrier 22. A plurality of inner pulleys 24 and a plurality of outer pulleys 26 are rotationally supported by the carrier 22. The inner pulleys 24 and the outer pulleys 26 are driven to rotate by a plurality of continuous loops of shape memory alloy 18. The carrier 22, inner pulleys 24, and outer pulleys 26 are generally concentrically arranged about a pipe or conduit 32 which generally surrounds or is located within the first region 12. Fluid may flow through the conduit 32, as indicated by arrow F. The first region 12 may surround the conduit 32 such that the shape memory alloy 18 is in thermal contact or heat exchange relationship with the first region 12. Alternatively, the first region 12 may be the conduit 32 and the shape memory alloy 18 may physically contact with the conduit 32 to provide the desired heat exchange relationship with the first region 12.

Fluid within the energy harvesting system 42 (shown in FIG. 1) forming the first region 12 and/or the second region 14 may be selected from a group of gases, liquids, and combinations thereof. The fluid in the first region 12 may be exhaust, for example, and the conduit 32 may be an exhaust pipe for the vehicle 10. On the other hand, the conduit 32 may be a radiator hose and fluid in the first region 12 would be radiator fluid. The fluid in the second region 14 would therefore be air surrounding the exhaust pipe or radiator hose. The heat engine 16 is arranged about the exhaust pipe or radiator hose to take advantage of the temperature differential between the interior of the exhaust pipe or radiator hose and the exterior environment.

As localized regions of the shape memory alloy 18 move between thermal contact or heat exchange relation with the first region 12 and the second region 14, the shape memory alloy 18 dimensionally expands and contracts. Additionally, the modulus of the shape memory alloy 18 changes as the localized regions of the shape memory alloy 18 move between thermal contact or heat exchange relation with the first region 12 and the second region 14. In response to the dimensionally expanding and contracting shape memory alloy 18 and the accompanying changes in modulus, the carrier 22 is driven to rotate in a first rotational direction, indicated by arrow 28, about a first axis A.

In further detail, the inner pulleys 24 and the outer pulleys 26 are arranged in an alternating pattern. The shape memory alloy 18 forms a plurality of continuous loops that each wrap around a radial interior of the inner pulleys 24 and a radial exterior of the outer pulleys 26. The radial interior and radial exterior directions are in reference relative to the radial relationship with respect to the first axis A.

The temperature differential between the first region 12 and the second region 14 causes the shape memory alloy 18 to sufficiently dimensionally contract or expand to rotate the outer pulleys 26 in a second rotational direction 30 and the inner pulleys 24 in a third rotational direction 34. The second rotational direction 30 is opposing to the first rotational direction 28 and the third rotational direction 34. The outer pulleys 26 rotate about the second axes B and the inner pulleys 24 rotate about third axes C both of which are parallel to the first axis. The sufficient dimensional contraction or expansion of the shape memory alloy 18 causes the inner pulleys 24, the outer pulleys 26, and the carrier 22 to rotate or "walk" around the conduit 32. The carrier 22 may be connected to the component 20 (shown in FIG. 1) such that the rotation of the carrier 22 relative to the conduit 32 provides a rotational output that may drive the component 20. The plurality of loops of the shape memory alloy 18 each have sufficient dimensional contraction and expansion at multiple locations about their circumference, which creates a cumulative driving torque on the inner pulleys 24 and the outer pulleys 26.

Speed of rotation of the carrier 22 relative to the component 20 may optionally be modified by one or more gear sets (not shown). Additionally, the temperature differential between the first region 12 and the second region 14 will increase with distance between the inner pulleys 24 and the outer pulleys 26. Therefore, the distance between the second axes B and the third axes C may be increased or decreased as required to allow the shape memory alloy 18 more or less distance between the inner portion of the inner pulleys 24 and the outer portion of the outer pulleys 26. Thus, increasing or decreasing the temperature differential experienced by the shape memory alloy 18 and the overall speed of movement of the heat engine 16. One skilled in the art would be able to determine the optimal distance between the second axes B and the third axes C for a given shape memory alloy 18 and energy harvesting device 42. The shape memory alloy 18 may contact or expand in localized regions. These localized regions may be located between the inner pulleys 24 and the outer pulley 26, or may be the inner portion of the inner pulley 24 and the outer portion of the outer pulleys 26.

Further, the component 20 may include a drive shaft 38 (shown in FIG. 1) attached to the inner pulleys 24 and/or outer pulleys 26. As the shape memory alloy 18 drives the inner pulleys 24 and/or outer pulleys 26 to rotate about the axes B and C of the heat engine 16, the support rotates the drive shaft 38 and drives the component 20. Alternately, the carrier 22 may be a driven component of a generator, such as the rotor for the generator.

Figure 4:
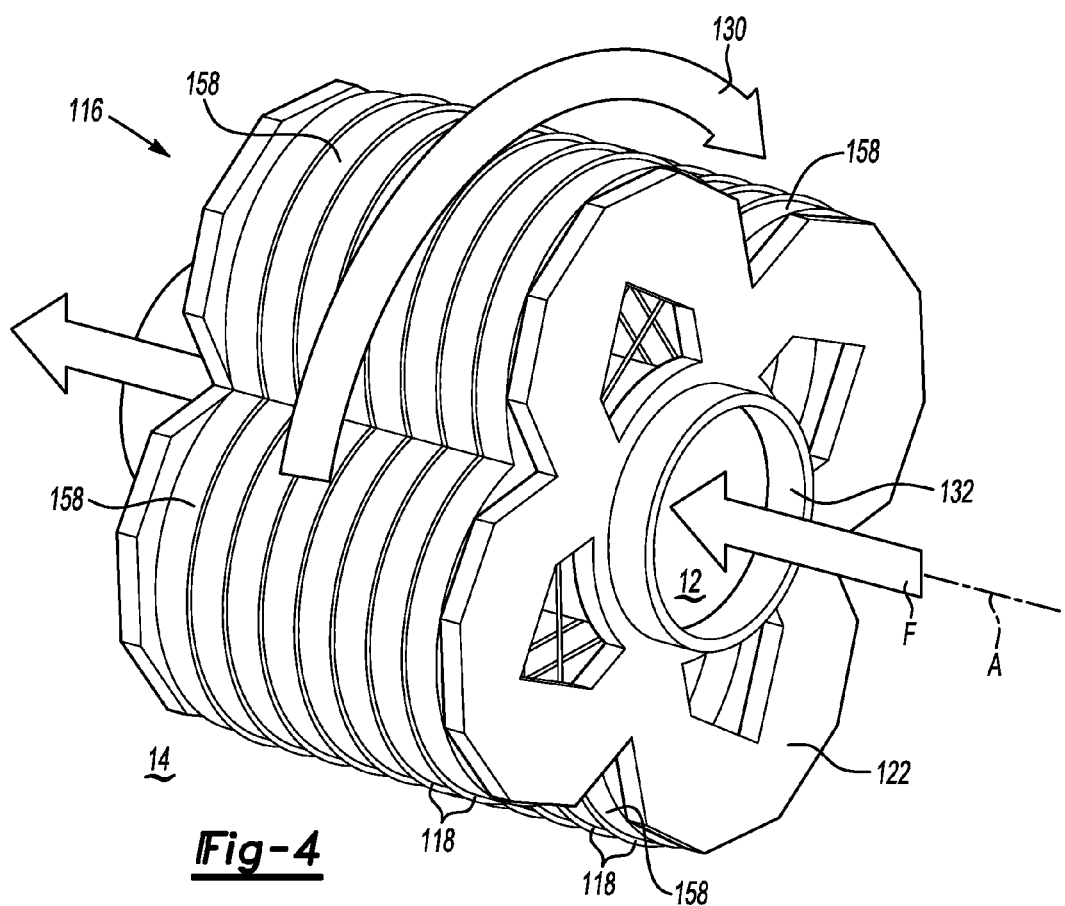
FIG. 4 is a schematic perspective view of a second embodiment of the energy harvesting system of FIG. 1.
Figure 5:
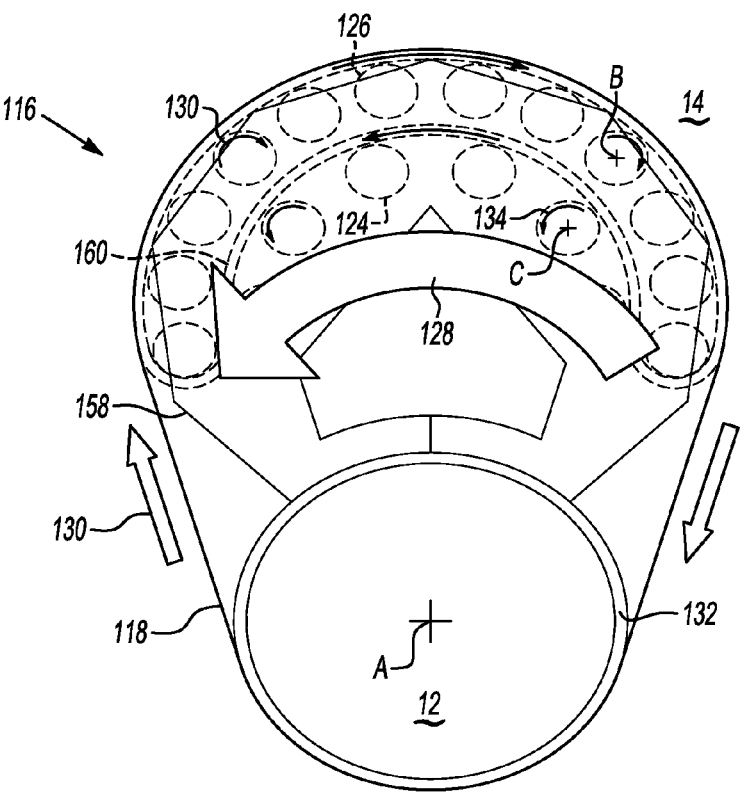
FIG. 5 is a partial schematic end view of the second embodiment of the energy harvesting system of FIGS. 1 and 4.

FIGS. 4 and 5 illustrate a second embodiment of a heat engine 116 for use with a heat exchange system 142 for a vehicle 10 (shown in FIG. 1). The heat engine 116 may include an eccentrically shaped carrier 122. A plurality of inner pulleys 124 and a plurality of outer pulleys 126 are rotationally supported by the carrier 122 and driven to rotate by a plurality of parallel continuous loops of shape memory alloy 118. The inner pulleys 124, and outer pulleys 126 are generally eccentrically arranged within lobes 158 of the carrier 122. The lobes 158, inner pulleys 124, and outer pulleys 126 are generally eccentrically arranged about a pipe or conduit 132 which is the first region 12 or is generally located within the first region 12. Fluid may flow through the conduit 132, as indicated by arrow F. The shape memory alloy 118 is in thermal contact or heat exchange relationship with the first region 12.

As the localized regions of the shape memory alloy 118 move between thermal contact, or heat exchange relation, with the first region 12 and the second region 14, the shape memory alloy 118 dimensionally expands and contracts. Additionally, the modulus of the shape memory alloy 118 changes as the localized regions of the shape memory alloy 118 move between thermal contact, or heat exchange relation, with the first region 12 and the second region 14. In response to the dimensionally expanding and contracting shape memory alloy 118 and the accompanying changes in modulus, the carrier 122 is driven to rotate about a first axis A in a first rotational direction 128.

In further detail with reference to FIG. 5, which illustrates one lobe 158 of the carrier 122, the outer pulleys 126 are surrounded by a drive belt 160. The shape memory alloy 118 forms a continuous loop that wraps around the conduit 132, a radial exterior of the outer pulleys 126 and of the drive belt 160. The radial interior and radial exterior directions are in reference relative to the radial relationship with respect to the first axis A.

The temperature differential between the first region 12 and the second region 14 causes the shape memory alloy 118 to sufficiently dimensionally contract or expand in order to rotate the drive belt 160 around the outer pulleys 126. The shape memory alloy 118 rotates about the conduit 132 and rotation of the drive belt 160 rotates the outer pulleys 126. The shape memory alloy 118, drive belt 160 and the outer pulleys 126 all rotate in a second rotational direction 130. The drive belt 160 then rotates the inner pulleys 124 in a third rotational direction 134. The second rotational direction 30 is opposing to the first rotational direction 128 and the third rotational direction 134. The outer pulleys 126 rotate about second axes B and the inner pulleys 124 rotate about third axes C, both of which are parallel to the first axis A. The sufficient dimensional contraction or expansion of the shape memory alloy 118 causes the inner pulleys 124, the outer pulleys 126, and carrier 122 to rotate or "walk" around the conduit 132. The carrier 122 may be connected to the component 20 (shown in FIG. 1) such that the rotation of the carrier 122 relative to the conduit 132 may drive the component 20. The multiple continuous loops of the shape memory alloy 118 are arranged in parallel loops along each lobe 158. However, the axial location of the shape memory alloy 118 is staggered for each lobe 158 to prevent interference of the loops of shape memory alloy 118 between adjacent lobes 158. The carrier 122 shown in FIG. 4 has four lobes 158 which each have a plurality of continuous loops of the shape memory alloy 118. However, a carrier 122 may have more or fewer lobes 158. One skilled in the art would be able to determine the number of lobes 158 for a particular heat engine 116.

Speed of rotation of the carrier 122 relative to the component 20 may optionally be modified by one or more gear sets (not shown). Moreover, the component 20 may include a drive shaft 38 (shown in FIG. 1) attached to the carrier 122. As the shape memory alloy 118 drives the inner pulleys 124 and outer pulleys 126 to rotate about the axes B and C of the heat engine 116, the carrier 122 rotates the drive shaft 38 and drives the component 20. Alternately, the carrier 22 may be a driven component of a generator, such as the rotor for the generator.

While the best modes for carrying out the invention have been described in detail, those familiar with the art to which this invention relates will recognize various alternative designs and embodiments for practicing the invention within the scope of the appended claims.

The invention claimed is:

1. An energy harvesting system comprising:
a first region having a first temperature;
a second region having a second temperature that is different from the first temperature;
a conduit located at least partially within the first region;
a heat engine configured for converting thermal energy to mechanical energy including:
a shape memory alloy forming at least one generally continuous loop, wherein the shape memory alloy is disposed in heat exchange contact with each of the first region and the second region;
a carrier surrounding the conduit such that the carrier is driven to rotate around the conduit by the shape memory alloy in response to the temperature difference between the first region and the second region;
a plurality of inner pulleys and a plurality of outer pulleys rotatably mounted to the carrier in an alternating relationship to one another, and wherein the shape memory alloy is alternately threaded about an interior of the plurality of inner pulleys and an exterior of the plurality of outer pulleys to form the at least one continuous loop; and
a component driven by the rotation of the carrier.

2. The energy harvesting system of claim 1, wherein a portion of the shape memory alloy is in contact with the conduit and the interior of each of the inner pulleys to thereby support the heat engine about the conduit.

3. The energy harvesting system of claim 1, wherein the shape memory alloy further comprises a plurality of continuous loops each threaded in the same alternating relationship among the plurality of the inner pulleys and the plurality of the outer pulleys.

4. The energy harvesting system of claim 1, wherein the inner pulleys are at least partially located within the first region and the outer pulleys are at least partially located within the second region.

5. The energy harvesting system of claim 1, wherein the localized regions of the shape memory alloy are expanded and contracted between the plurality of inner pulleys and the plurality of outer pulleys.

6. The energy harvesting system of claim 1, wherein the component is a generator.

7. The energy harvesting system of claim 6, wherein carrier is a rotor for the generator.

8. An energy harvesting system comprising:
a first region having a first temperature;
a second region having a second temperature that is different from the first temperature;
a conduit located at least partially within the first region;
a heat engine configured for converting thermal energy to mechanical energy including:
a shape memory alloy forming at least one generally continuous loop, wherein the shape memory alloy is disposed in heat exchange contact with each of the first region and the second region;
a carrier surrounding the conduit such that the carrier is driven to rotate around the conduit by the shape memory alloy in response to the temperature difference between the first region and the second region, wherein the carrier having a plurality of lobes, wherein each of the plurality of lobes partially surrounds the conduit, such that the plurality of lobes together surround the conduit and rotate about the conduit each at the same rate as one another; and
a component driven by the rotation of the carrier.

9. The energy harvesting system of claim 8, wherein the heat engine further comprises a plurality of inner pulleys and a plurality of outer pulleys rotatably mounted to each of the plurality of lobes, and wherein the at least one continuous loop of the shape memory alloy is threaded around the conduit and the plurality of outer pulleys for a respective one of the plurality of lobes to rotate the plurality of outer pulleys and the plurality of inner pulleys to thereby drive the carrier to rotate around the conduit.

10. The energy harvesting system of claim 9, wherein the shape memory alloy further comprises of a plurality of continuous loops each threaded around one of the respective lobes.

11. The energy harvesting system of claim 10, wherein each of the respective lobes has a plurality of continuous loops of the shape memory alloy threaded thereabout.

12. A method of harvesting energy comprising:
moving localized regions of a shape memory alloy between heat exchange contact with a first region having a first temperature and a second region having a second temperature that is different from the first temperature, including threading the loop of the shape memory alloy alternately through an interior of a plurality of inner pulleys and an exterior of a plurality of outer pulleys rotatably mounted to the carrier in an alternating relationship to one another, such that at least one continuous loop of the shape memory alloy rotates around a conduit located within the first region in response to the temperature difference between the first region and the second region;
rotating a carrier with the shape memory alloy; and
driving a component with the rotation of the carrier.

13. A method of harvesting energy comprising:
moving localized regions of a shape memory alloy between heat exchange contact with a first region having a first temperature and a second region having a second temperature that is different from the first temperature, such that at least one continuous loop of the shape memory alloy rotates around a conduit located within the first region in response to the temperature difference between the first region and the second region;
rotating a carrier with the shape memory alloy by rotating a plurality of lobes about the conduit at the same rate as one another, wherein each of the plurality of lobes partially surrounds the conduit and is secured to the carrier; and
driving a component with the rotation of the carrier.

14. The method of claim 13, wherein moving the localized regions of the shape memory alloy between heat exchange contact with the first region and the second region further comprises threading the loop of the shape memory alloy around the conduit and a plurality of inner pulleys and a plurality of outer pulleys rotatably which are mounted to a respective one of the plurality of lobes to thereby drive the at least one carrier to rotate around the conduit.

15. A vehicle comprising:
a conduit for the vehicle;
a first region having a first temperature, wherein the first region surrounds the conduit;
a second region having a second temperature that is different from the first temperature, wherein the second region at least partially surrounds the first region;
a heat engine configured for converting thermal energy to mechanical energy including:
a carrier concentrically located about the conduit;
a plurality of inner pulleys rotatably mounted to the carrier;
a plurality of outer pulleys rotatably mounted to the carrier in an alternating relationship with the inner pulleys;
at least one continuous loop of a shape memory alloy alternately threaded about an interior of the plurality of inner pulleys and an exterior of the plurality of outer pulleys surrounding the conduit; and
wherein the shape memory alloy is disposed in heat exchange contact with each of the first region and the second region such that the carrier is driven to rotate around the conduit by the shape memory alloy in response to the temperature difference between the first region and the second region; and
a component of the vehicle driven by the rotation of the carrier.

16. The vehicle of claim 15, wherein the conduit is one of an exhaust pipe and radiator hose for the vehicle.

17. The vehicle of claim 16, wherein a portion of the shape memory alloy is in contact with the one of the exhaust pipe and the radiator hose and the interior of each of the plurality of inner pulleys to support the heat engine about the one of the exhaust pipe and the radiator hose.

18. The vehicle of claim 15, wherein the at least one continuous loop of the shape memory alloy further comprises a plurality of continuous loops each threaded in the same alternating relationship between the plurality of inner pulleys and the plurality of outer pulleys.

19. The vehicle of claim 15, wherein the plurality of inner pulleys are at least partially located within the first region and the plurality of outer pulleys are at least partially located within the second region.

* * * * *